Nov. 8, 1932.  P. J. SHRUM  1,887,332
PIPE END PROTECTOR
Filed May 10, 1930   3 Sheets-Sheet 1
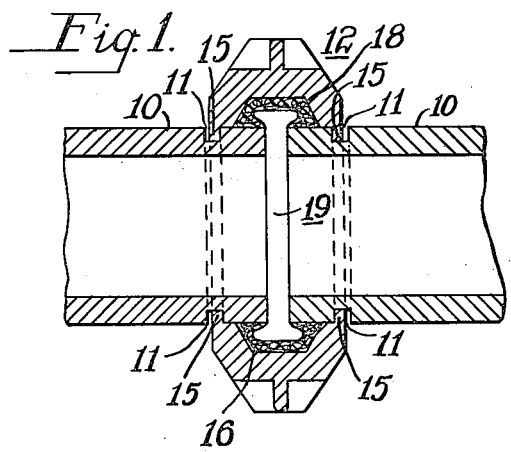
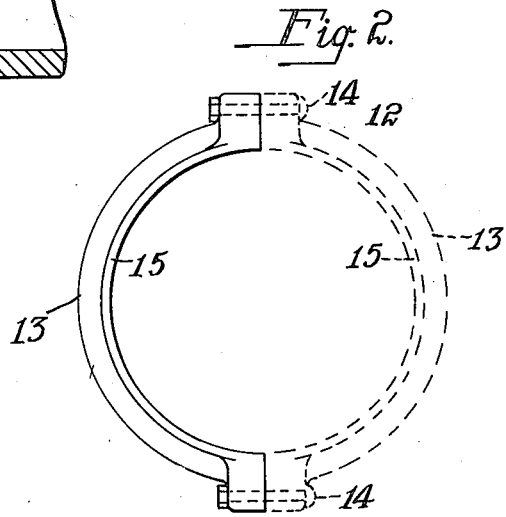
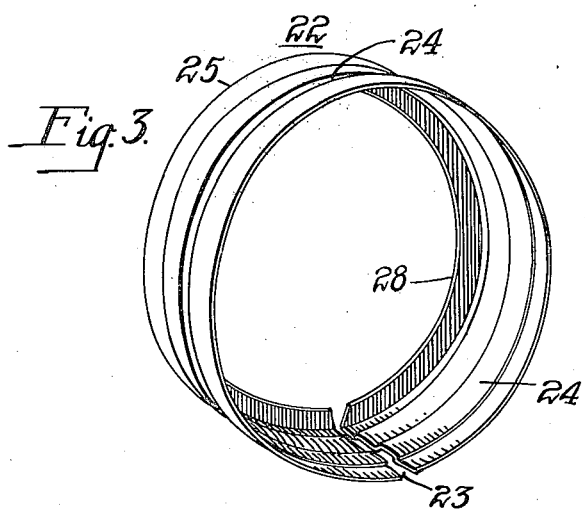
INVENTOR
Peter J. Shrum
By Green & McCallister
His Attorneys Nov. 8, 1932.  P. J. SHRUM  1,887,332
PIPE END PROTECTOR
Filed May 10, 1930    3 Sheets-Sheet 2
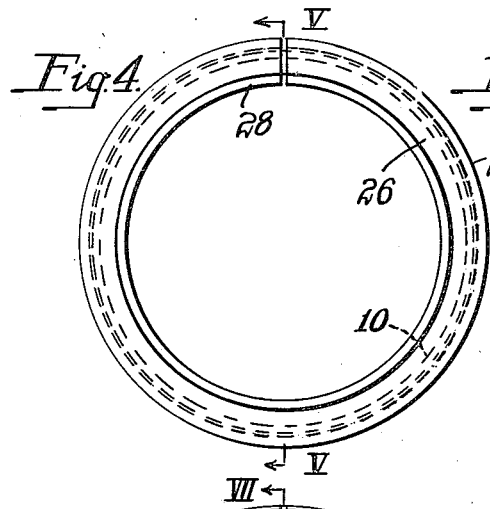
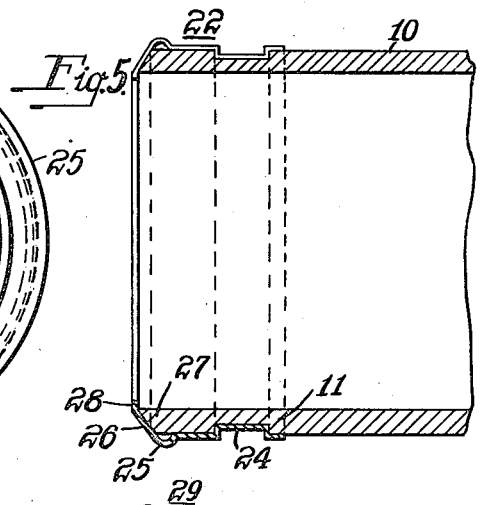
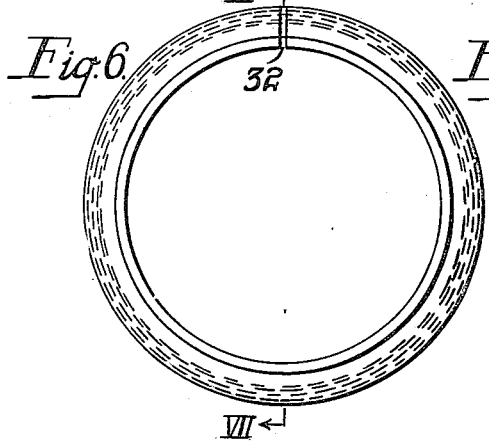
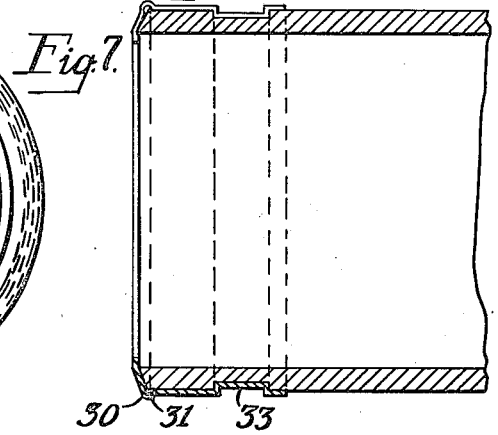
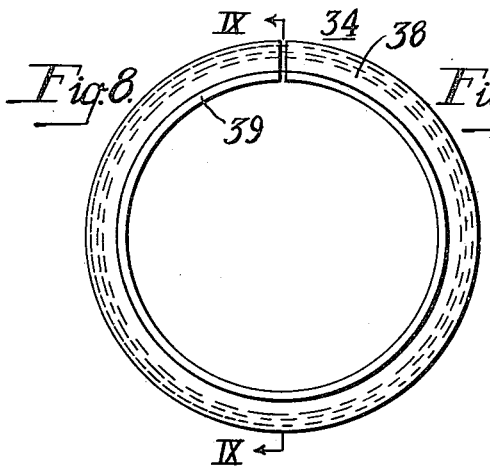
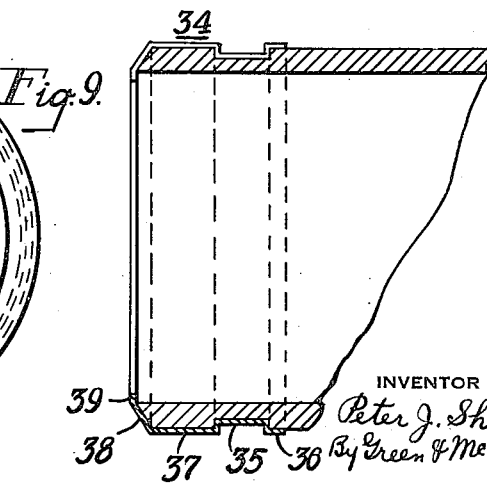
INVENTOR
Peter J. Shrum
By Green & McCallister
His Attorneys Nov. 8, 1932.    P. J. SHRUM    1,887,332
PIPE END PROTECTOR
Filed May 10, 1930    3 Sheets-Sheet 3
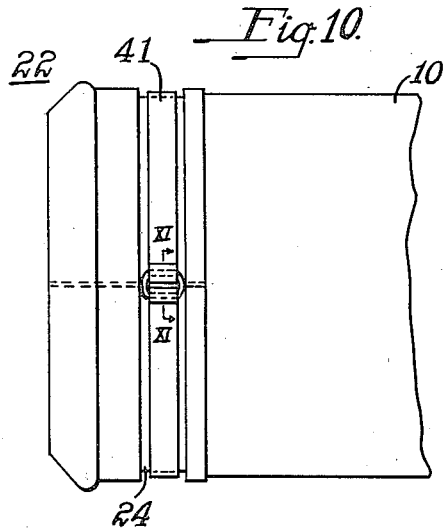
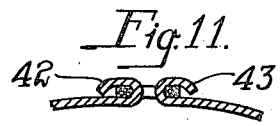
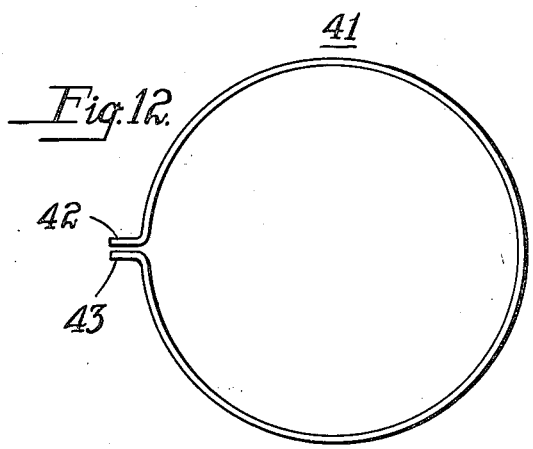
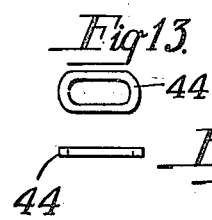
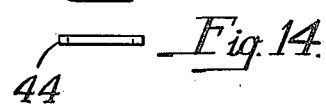
INVENTOR
Peter J. Shrum
By Green & McCallister
His Attorneys Patented Nov. 8, 1932

1,887,332

UNITED STATES PATENT OFFICE

PETER J. SHRUM, OF MONACA HEIGHTS, PENNSYLVANIA, ASSIGNOR TO PITTSBURGH SCREW AND BOLT CORPORATION, OF PITTSBURGH, PENNSYLVANIA, A CORPORATION OF PENNSYLVANIA

PIPE-END PROTECTOR

Application filed May 10, 1930. Serial No. 451,283.

This invention relates to pipe line constructions in which the several sections of pipe thereof are joined by threadless couplers, and more particularly to protectors for the ends of such pipe sections.

At the present time there are various threadless pipe couplings available to the trade for joining together adjacent ends of steel, wrought and cast iron pipe sections. Such pipe sections are provided with annular coupling grooves near the ends thereof and are held together by the couplings.

The pipe couplings comprise two metal half housings, an inner ring of special packing and two bolts for clamping the half sections together about the pipe joint. The clamps are provided with annular flanges that register with the coupling grooves and hold the pipes against longitudinal movement except for certain allowable movements to accommodate expansion and contraction in the pipe line.

The effectiveness of such pipe couplings depends largely upon the condition of the pipe ends after shipment to the customer. Often, during transportation and handling of the pipe sections, the pipe ends are flattened, bent or otherwise damaged so that the pipe ends either cannot be lined up properly in the couplings, or if they can be lined up, the joint is leaky and inefficient.

An object of this invention is to provide a simple and relatively inexpensive pipe-end protector for threadless pipe of the type referred to above.

Another object of the invention is the provision of a pipe-end protector that may be easily mounted in place and quickly and easily removed.

A further object of the invention is to provide a pipe-end protector for threadless pipe that shall give such added strength to the pipe ends, when mounted in place, that the pipe ends shall not be flattened, misshaped or otherwise damaged while being handled or during transportation.

Other objects of the invention will, in part, be apparent and will, in part, be obvious from the following description taken in conjunction with the accompanying drawings in which:

Figure 1 is a partial view in section of adjacent ends of threadless pipe joined by a coupling;

Fig. 2 is a view in elevation of a half part of a coupling member shown in Fig. 1;

Fig. 3 is a view in perspective of a preferred form of protector;

Fig. 4 is an end view of a pipe section having the pipe-end protector of Fig. 3 thereon;

Fig. 5 is a view in section of the structure shown in Fig. 4 taken on line V—V thereof;

Fig. 6 is an end view similar to Fig. 4 showing a modified form of pipe-end protector;

Fig. 7 is a view in section of the pipe and pipe-end protector shown in Fig. 6 taken on line VII—VII thereof;

Fig. 8 is a still further modified form of a pipe-end protector;

Fig. 9 is a view in section taken on line IX—IX of Fig. 8;

Fig. 10 is a view in side elevation of the pipe-end protector shown in Figs. 4 and 5 having means thereon for preventing springing apart of the protector after it is in operative position;

Fig. 11 is a partial view in section taken on line XI—XI of Fig. 10;

Fig. 12 is a plan view of a clamping member embodied in Fig. 10 and shown partially in section in Fig. 11; and Figs. 13 and 14 are plan and side views in elevation, respectively, of a locking washer for holding the clamping member of Fig. 12 in place.

Throughout the drawings and the specification like reference characters indicate like parts.

In Fig. 1 of the drawings two pipe sections 10, forming part of a pipe line composed of any desired number of pipe sections or lengths, are shown placed end-to-end so that adjacent ends are in alinement. Each pipe section 10 is provided with an annular groove or recess 11 near the ends thereof. The pipe sections are held together in proper alinement by a coupling 12. The coupling 12 comprises two similar members 13, only one of which is shown in full in Fig. 2 of the drawings joined or clamped together by bolts 14. The members 13 are provided with annular depending flanges 15 so designed that they will register with the annular grooves 11 formed in the ends of the pipe sections. The grooves 11 are purposely made wider than the flanges 15 in order that the ends of the pipe sections may move towards or away from each other as contraction or expansion takes place in the pipe line.

A tight joint may be obtained between the meeting ends of the pipe sections by means of an annular packing member 16 disposed in an annular recess 18 formed in the members 13 of the coupling 12. The annular packing member 16 is so shaped and designed that it straddles the space 19 between the ends of the pipe sections and bears or rests upon the ends of the pipe sections. When the bolts 14 are drawn up tightly, a tight flexible joint is obtained between the adjacent pipe sections and the pipe sections are held firmly and positively in engagement.

The efficiency and the success of pipe couplings of the type shown in Figs. 1 and 2 of the drawings depends to a large extent upon the condition of the ends of the pipe sections at the time they are to be joined or coupled together in the manner shown in Fig. 1. It often happens during the handling of these pipe sections, and during transportation also, that the ends of the pipe sections become flattened, distorted or otherwise damaged so that the couplings 12 cannot be properly mounted in position to obtain a fluid-tight joint. If the pipe ends are flattened to any extent, the pipe couplings which would ordinarily fit these pipe sections would be too small, and, even if not too small, the coupling might not fit with sufficient accuracy to permit a satisfactory joint being obtained.

In order that the ends of the pipe sections may be properly protected during transportation and during the handling thereof, a protector 22 is provided (see Figs. 3, 4 and 5 of the drawings). The protector 22 may be made from strips of steel or other suitable metal and rolled into the form or shape of a cylinder. When so rolled and shaped, the meeting edges of the protector are spaced apart as indicated at 23. The protector 22 is provided with a circumferential rib or corrugation 24 which, when the protector is mounted in place on the end of a pipe section 10, registers or is received in the annular groove 11. The protector 22 is provided also with a bell-like flange or outwardly projecting annular bead 25 adjacent to the open end of the pipe section 10. The bead 25 terminates in a sloping portion 26 the angle of slope thereof being substantially in conformity to the angle at which the end of the pipe is beveled as indicated at 27. The sloping portion 26 of the protector extends beyond the inner surface of the pipe so as to provide an annular projection 28.

The protector 22 when formed is open at both ends and is somewhat in appearance like a cup. In mounting the protector in place, it is forced over the end of the pipe and into place so that the circumferential rib or corrugation 24 registers with the annular groove 11. The act of forcing the protector in place springs the same so that its meeting edges spread apart. When in place, the protector contracts and firmly grips the end of the pipe. The bead-like portion 25 extends out from the end of the pipe, so that an annular space obtains between the pipe end and the protector. Bead-like portion 25, therefore, adds rigidity and stiffness to the protector and guards the pipe end against blows which would ordinarily be damaging. The protector 22 may be made of relatively heavy gage metal so as to add to the strength and rigidity of the pipe end thereby increasing its resistance to bending or flattening while in transportation or while being handled. When the pipes having end protectors thereon are ready to be assembled in a pipe line, the protector may be easily removed by any suitable tool. A pipe having a protector 22 thereon will be substantially circular and will have retained its original shape during transportation and handling so that it may be easily mounted or assembled in a pipe line. When the couplings 12 are attached, an efficient joint may be obtained because the pipe end has not been damaged, bent or misshaped during handling or transportation. Since the protector 22 covers the annular groove 12 and also the surface of the pipe on each side thereof, the groove will be of such a shape when the pipe is to be assembled in a pipe line that the coupling 12 may be easily mounted in place.

In Figs. 6 and 7 of the drawings, a modified form of pipe protector 29 is shown. The pipe protector 29 is similar to the protector 22 except it is provided with an annular upwardly extending bead 30 so formed and positioned that the outer surface of the pipe terminating at the beveled surface 27 is protected from blows or other external forces which would tend to damage the end of the pipe. The annular bead 30 extends away from the pipe as shown so that a clearance space 31 is provided. The bead 30 of the pipe protector may be damaged by blows, but these blows will be absorbed by the annular bead thereby protecting the pipe.

The protector 29 may be rolled from strips of sheet metal so that the meeting edges are spaced apart as indicated at 32 to permit the protector to expand or contract according to irregularities in size of the pipe ends. The protector 29 is provided with a circumferential rib or corrugation 33 so shaped that it will register in or be received by the annular groove 11 in the pipe section. The pipe protector 29 is mounted on and removed from pipe sections in the same manner as the protector 22.

In Figs. 8 and 9 of the drawings a pipe-end protector 34 is illustrated. This protector may be made by rolling strips of sheet metal and may be provided with a circumferential rib or corrugation 35 disposed for reception in the annular groove 11 of the pipe. The protector 34 includes also a cylindrical portion 36 and a cylindrical portion 37 disposed on opposite sides of the groove 11 so as to protect the same from injury either during transportation or during handling of the pipe. The cylindrical portion 37 terminates in an annular inclined portion 38 conforming to the beveled surface 27 at the end of the pipe. The portion 38 continues on past the inner surface of the pipe as at 39 so as to protect the extreme inner edge of the pipe.

The protector shown in Figs. 3 to 9, inclusive, may be applied to various sized pipes. However, for pipe sizes above eight inches in diameter it may be desirable in order to insure that the protectors shall not spring apart and become disengaged from the pipes, to provide some positive means for preventing springing apart of the protectors. In Fig. 10 of the drawings the pipe 10 and protector 22 of Figs. 4 and 5 is shown with a locking band 41 disposed within the circumferential rib or corrugation 24. The locking band is of such width that it will lie within this rib or corrugation. The locking band 41 may be applied to any or all of the modifications of pipe end protector shown in Figs. 3 to 9, inclusive, and it is to be understood that it is not limited to the particular construction shown in Fig. 10.

The meeting ends of the locking band 41 are bent upwardly as shown at 42 and 43. In placing the band 41 in position as shown in Fig. 10 it is sprung apart so that it may pass over the end of the protector 22 and be placed in the circumferential rib or corrugation 24. A washer 44 is then placed over the upturned portions 42 and 43 of the locking band. When the washer has been so placed as shown in Fig. 11 of the drawings the ends 42 and 43 are folded or bent over the opposite sides of the washer as shown in Fig. 11. The locking band is then positively locked in position and is prevented from springing apart. When the locking band is assembled with its washer as shown in Figs. 10 and 11, the protector 22 is positively locked in place and cannot spring apart while the pipes are in transportation or being handled.

When the pipes with the protectors mounted on the ends thereof have reached their destination and are in position to be assembled in a pipe line, the ends 42 and 43 may be straightened in such a manner that the washer 44 may be removed. Upon removing the washer 44, the band 41 may be sprung apart and removed from the circumferential rib or corrugation 24. The protector 22 may now be sprung apart and removed from the end of the pipe.

While one form of locking band has been shown and described, it is to be understood that other means may be employed for positively holding the pipe protectors in place while in transportation or while being handled.

In all of the forms of the invention disclosed herein, the circumferentially extending rib or corrugation which is adapted to lie within the circumferential depression in the pipe near its end, is rounded or convexed so that such rib or corrugation will not cut into the pipe as it is driven into operative position. The rib or corrugation is preferably formed in this manner also, in order that the protector may be caused to spread or expand as it is driven over the pipe end; the protector being resilient, it will snap the annular rib or corrugation into the groove or depression in the pipe.

By the invention herein disclosed, a simple and relatively inexpensive pipe-end protector is provided that is particularly and well adapted for use in connection with threadless pipe sections having annular coupling grooves near the ends thereof. The pipe-end protector may be easily mounted in place by forcing it over the end of a pipe and since the protector is split along one side, the protector will spread apart while being so forced and will contract and tightly grip the pipe end when in operative position. The protector protects not only the coupling grooves, but also the extreme end of the pipe thereby insuring that the pipe end will be of the proper shape when the pipe section arrives at its destination and is ready to be assembled in a pipe line. The pipe protector may be made of relatively heavy gage metal so as to give added strength to the pipe end which is a necessary factor in insuring that the pipe ends will not be flattened or distorted during transportation or during handling.

While various modifications and changes may be made in the pipe-end protector herein disclosed, without departing from the spirit and the scope of the invention, it is to be understood that only such limitations shall be placed on the invention as are imposed by the prior art and the appended claims.

What I claim as new and desire to secure by Letters Patent is:

1. A pipe-end protector for threadless pipe, said protector comprising a cup-shaped member having an open bottom and provided with an annular outwardly extending portion adjacent the bottom thereof and a circumferential corrugation rectangular in section formed on the inner surface of said member and adapted to be received in a coupling groove in a pipe-end for protecting the shoulders of said groove and for maintaining the protector on said pipe.

2. A pipe-end protector for threadless pipe, comprising a cup-shaped member having an open bottom, a circumferential corrugation rectangular in section formed on the inner surface thereof, and an outwardly extending annular bead adjacent the bottom thereof for stiffening said member, said cup-shaped member being split longitudinally thereof for permitting the same to be forced over the end of the pipe.

3. A protector for the ends of threadless pipe, comprising an annular wall portion adapted to be forced over the end of a pipe and having a depressed portion therein adapted to engage a coupling groove in the pipe for maintaining the protector thereon, an inwardly extending flange for protecting the end of the pipe, and an outwardly projecting curved portion connecting said annular wall with said inwardly extending flange.

4. A protector for the ends of threadless pipe, comprising a longitudinally split annular member adapted to surround the end of a pipe and having a circumferential rib of substantially rectangular cross section projecting from the inner surface thereof and adapted to engage a coupling groove in said pipe, and a beadlike portion on the outer wall for forming an annular space between said protector and the end of the pipe covered thereby.

5. A protector for the ends of threadless pipe comprising a longitudinally split annular member adapted to be sprung over the end of a pipe, and having a circumferential rib on the inner surface thereof adapted to engage a coupling groove in said pipe for holding said protector thereto, an annular flange at one end of said annular member for protecting the outer end of said pipe and a wall joining said circumferential rib with said flange.

6. A pipe end protector comprising a longitudinally split annular member having an inwardly extending circumferential rib of substantially rectangular cross section formed on the inner surface thereof, an inwardly sloping wall, an outwardly extending curved wall connecting said circumferential rib with said sloping wall, and an inwardly projecting flange on the end of said sloping wall.

7. A pipe-end protector for threadless pipe, comprising a longitudinally split annular member having an outwardly projecting bead on one end thereof terminating in an inwardly projecting flange, and a rib extending inwardly from the inner surface of said member.

8. A protector for the ends of threadless pipe, comprising a longitudinally split annular member having a circumferential rib on the inner surface thereof, an inwardly projecting annular flange at one end of said member, and a wall having a portion thereof curved outwardly, joining said flange with said rib.

In testimony whereof, I have hereunto subscribed my name this 6th day of May, 1930.

PETER J. SHRUM.